Sept. 22, 1959   J. W. DAVISON ET AL   2,905,734
CRACKING AND SEPARATION PROCESS FOR MAKING ETHYLENE
Filed Aug. 2, 1956
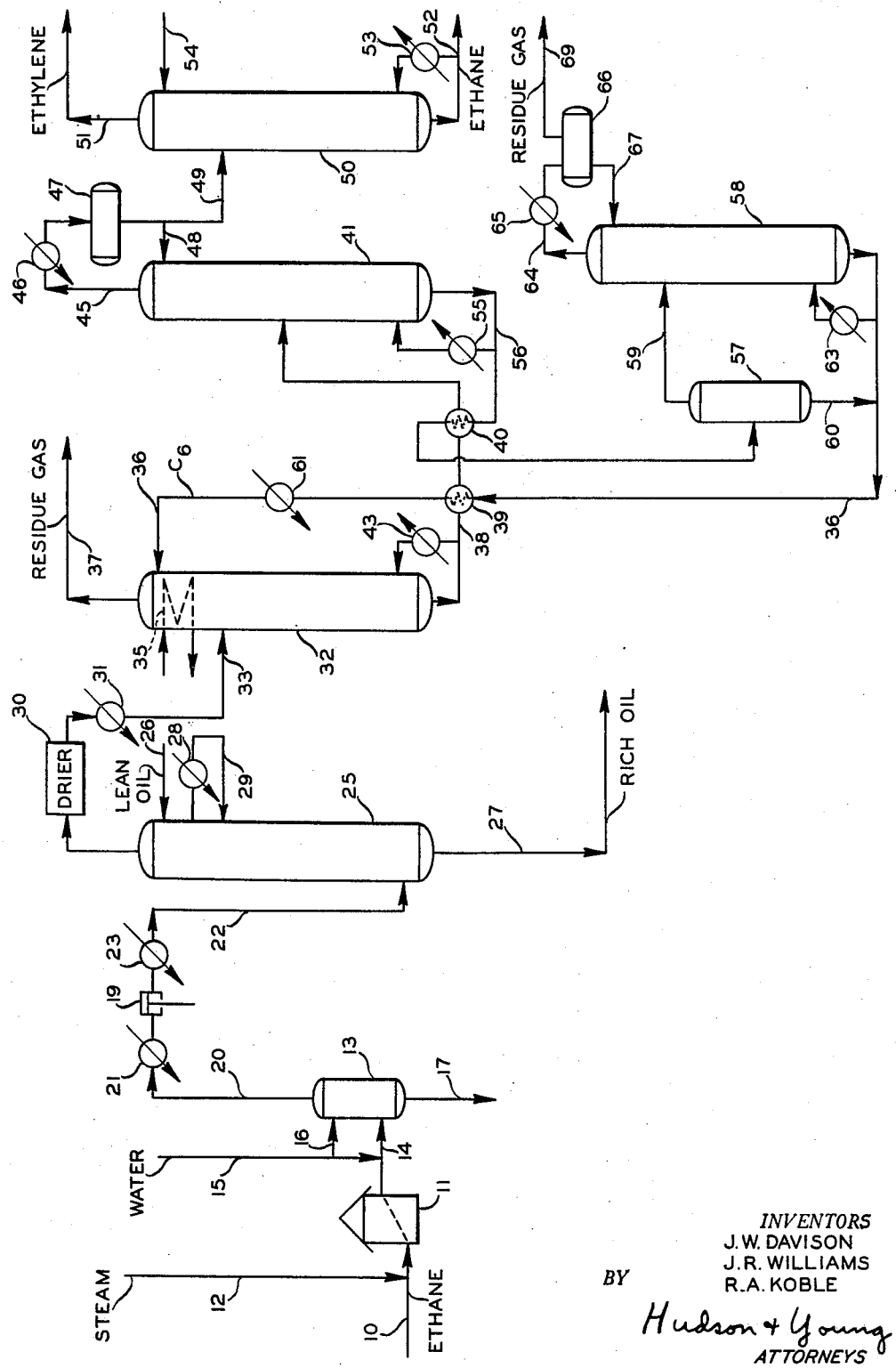
INVENTORS
J. W. DAVISON
J. R. WILLIAMS
R. A. KOBLE
BY
Hudson & Young
ATTORNEYS

United States Patent Office 2,905,734
Patented Sept. 22, 1959

2,905,734

CRACKING AND SEPARATION PROCESS FOR MAKING ETHYLENE

Joseph W. Davison, Jack R. Williams, and Robert A. Koble, Bartlesville, Okla., assignors to Phillips Petroleum Company, a corporation of Delaware Application August 2, 1956, Serial No. 601,816

15 Claims. (Cl. 260—683)

This invention relates to the thermal cracking of light hydrocarbons and the separation of the cracking effluent into selected constitutents.

It is known that ethylene and other unsaturated hydrocarbons can be produced advantageously by the thermal cracking of light hydrocarbons such as ethane, propane, or butane. In accordance with the present invention, there is provided an improved process for thermally cracking ethane and recovering ethylene. The effluent from the cracking zone is directed to an absorber wherein all of the $C_6$ and heavier components and most of the $C_5$ components are removed. The gaseous effluent from the adsorber is then directed to a reboiled absorber wherein the constituents heavier than methane are absorbed by the use of a hydrocarbon absorbent which boils in the range of approximately 120 to 190° F. This absorbent preferably is substantially paraffinic. Methane and hydrogen are removed from the overhead of the reboiled absorber, and the ethylene, ethane, acetylene and heavier constituents are directed to a fractionation column which is operated as a deethanizer. Ethylene, ethane and acetylene are removed from the overhead of the deethanizer and are subsequently separated into the desired individual constituents by conventional fractionation processes. The bottoms from the deethanizer, which contains the $C_3$ and heavier constituents, is stripped of the $C_3$, $C_4$, and $C_5$ constituents and recycled.

The initial removal of the $C_6$ and heavier components substantially eliminates plugging of the reboiled adsorber caused by polymerization taking place therein. An absorbent which boils in the range of approximately 120 190° F. can then be employed in the demethanizing operation. This results in quite low absorbent losses even at moderate refrigeration levels.

Accordingly, it is an object of this invention to provide an improved process for producing ethylene by thermally cracking a normally gaseous saturated hydrocarbon.

Another object is to provide an improved process for separating ethylene from a fluid mixture containing ethylene and other constituents having boiling points above and below the boiling point of ethylene.

Another object is to provide an absorption process to separate methane from a fluid mixture containing ethylene and other constituents having boiling points higher than the boiling point of methane.

Other objects, advantages and features of the invention should become apparent from the following detailed description which is taken in conjunction with the accompanying drawing which is a schematic representation of suitable apparatus which can be employed to carry out the process of this invention.

With reference to the drawing, a free stream comprising relatively pure ethane is directed through a conduit 10 to the inlet of a cracking furnace 11. Steam is introduced into conduit 10 by means of a conduit 12 to serve as a diluent. The effluent from cracking furnace 11 is directed to the lower region of the quench drum 13 by means of a conduit 14. Water is introduced into conduit 14 and drum 13 by means of respective conduits 15 and 16 in order to quench the furnace effluent. Water and small amounts of tars are removed from drum 13 through a conduit 17. The gaseous effluent from drum 13 is directed to the inlet of a compressor 19 through a conduit 20 which has a cooler 21 therein. The compressed gases are directed through a conduit 22 which has a cooler 23 therein to the lower region of an absorption column 25.

A lean absorbent, which preferably is a mineral seal oil, is sprayed into the top of column 25 from a conduit 26. The rich oil is removed from the lower region of column 25 through a conduit 27. This rich oil is subsequently stripped by apparatus, not shown, and recycled to column 25. Column 25 is refrigerated by directing a portion of the fluid therein through a cooler 28 by means of a conduit 29. Column 25 is operated so that substantially all of the $C_6$ and heavier constituents of the feed mixture are removed by the absorption oil. A large portion of the $C_5$ constituents are likewise removed. The gaseous effluent from absorber 25 is directed through a dryer 30 and a cooler 31 to the inlet of a reboiled absorber 32 by means of a conduit 33.

Column 32 is refrigerated by means of a cooling coil 35 through which a refrigerant is circulated. An adsorption oil is sprayed into the top of column 32 from an inlet conduit 36. This adsorption oil boils in the range of approximately 120 to 190° F. and preferably is substantially paraffinic in nature. Column 32 is operated so that the residue gas which is removed from the upper portion thereof through a conduit 37 comprises essentially methane and hydrogen. The kettle product is removed through a conduit 38 which passes through heat exchangers 39 and 40 and communicates with the inlet of a fractionation column 41. Column 32 is provided with a reboiler 43.

Column 41 is operated to strip the $C_2$ components from the rich absorption oil that is supplied from column 32. The overhead gases from column 41 are directed by conduit 45 through a condenser 46 to an accumulator 47. A portion of the liquid in accumulator 47 is returned to column 41 as reflux through a conduit 48. The remaining liquid is directed through a conduit 49 to the inlet of a fractionation column 50. Column 50 is operated to separate the feed mixture into an overhead ethylene product which is removed through a conduit 51 and a kettle ethane product which is removed through a conduit 52. Column 50 is provided with a reboiler 53. A portion of the ethylene product is refrigerated by means not shown and is returned to column 50 as reflux through a conduit 54.

The kettle product from column 41 is directed by means of a conduit 56 through heat exchanger 40 to a flash chamber 57. The $C_5$ and lighter components as well as a portion of the $C_6$ components, are removed from the overhead of chamber 57 through a conduit 59 to the inlet of a fractionation column 58. The $C_6$ components which are condensed in column 58 and chamber 57 are returned to column 32 through conduits 60 and 36. A cooler 61 is incorporated in conduit 36.

Column 58 is operated to produce a kettle product which comprises the $C_6$ components and an overhead product which comprises the $C_5$ and lighter components. The kettle product is returned to column 32 through conduit 36. Column 58 is provided with a reboiler 63. The overhead vapors in column 58 are directed through a conduit 64 and a condenser 65 to an accumulator 66. The condensed liquid is refluxed to column 58 through a conduit 67. The gas in accumulator 66 is removed through a conduit 69.

As a specific example of the operation of the cracking and separating process of this invention, a feed stream comprising substantially pure ethane is directed to the inlet of furnace 11 at a rate of approximately 16,676 mols per day. This feed stream includes approximately 500 mols of methane and approximately 334 mols of propane. Steam is introduced into the feed mixture from conduit 12 at a rate of approximately 23,800 mols per day. The following table represents the compositions of fluids directed through the various conduits shown in the drawing.

*Table I*

| Component | Conduit (mols./day) | | | | | | | | | | | |
|---|---|---|---|---|---|---|---|---|---|---|---|---|
| | 14 | 15 | 26 | 27 | 33 | 37 | 38 | 49 | 51 | 52 | 56 | 69 | 36 |
| Hydrogen | 14,334 | | | 26 | 14,334 | 14,334 | | | | | | | |
| Methane | 3,303 | | | 38 | 3,303 | 3,290 | 13 | 13 | 13 | | | | |
| Acetylene | 178 | | | 12 | 178 | 89 | 89 | 89 | 89 | | | | |
| Ethylene | 13,500 | | | 508 | 13,496 | 269 | 13,227 | 13,227 | 13,095 | 132 | | | |
| Ethane | 12,593 | | | 798 | 12,575 | | 12,575 | 12,329 | 187 | 12,142 | 246 | 246 | |
| Propylene | 215 | | | 37 | 211 | | 211 | 149 | | 149 | 62 | 62 | |
| Propane | 85 | | | 17 | 83 | | 83 | 59 | | 59 | 24 | 24 | |
| Butadiene | 118 | | | 63 | 96 | | 100 | 14 | | 14 | 86 | 82 | 4 |
| Butylene | 40 | | | 19 | 34 | | 35 | 6 | | 6 | 29 | 28 | 1 |
| Cyclopentadiene | 74 | | | 104 | 1 | | 1 | | | | 1 | 1 | |
| Benzene and heavier | 44 | | 6 | 54 | | | | | | | | | |
| Water | 23,800 | 1,452,500 | 4 | 75 | | | | | | | | | |
| Hexane | | | | | | | | 11 | | 11 | 13,177 | 11 | 13,166 |
| Mineral seal oil | | | 2,606 | 2,606 | | | | | | | | | |
| Carbon+tar | 342 | | | | | | | | | | | | |

Recycle ethylene through conduit 54 is at the rate of 66,885 pounds per hour.

The above described material balance is accomplished by the following conditions. The effluent gases from furnace 11 are at a temperature of approximately 1500° F. and at a pressure of approximately 20 p.s.i.a. The quench water is introduced at a temperature of approximately 120° F. The gases removed from the overhead of quench drum 13 are at a temperature of approximately 160° F. These gases are subsequently compressed to a pressure of approximately 470 p.s.i.a. and cooled to a temperature of approximately 100° F. The temperatures and pressures in the various separation columns are set forth in the following table:

*Table II*

| | Column | | | | |
|---|---|---|---|---|---|
| | 25 | 32 | 41 | 50 | 58 |
| Pressure (p.s.i.a) | 450 | 400 | 250 | 135 | 100 |
| Temperature at top (° F.) | 65 | −52 | 5 | −65 | 226 |
| Temperature at bottom (° F.) | 120 | 65 | 356 | −28 | 297 |

While the invention has been described in conjunction with the thermal cracking of ethane, it is not limited thereto. Other gases such as propane and butane can be cracked to produce ethylene. However, the invention is particularly applicable to ethane cracking because smaller amounts of heaver constituents are formed. Absorber 25 is operated to remove all $C_6$ components and most of the $C_5$'s. This column can be operated at pressures generally in the range of 150 p.s.i.a to 450 p.s.i.a. at temperatures which avoid hydrate formation in the gas phase. The removal of $C_6$ constituents at this stage is valuable in preventing troubles due to polymerization in the reboiler of column 32. The absorbent employed in column 32 is a hydrocarbon or mixture of hydrocarbons boiling in the range of 120 to 190° F. This absorbent preferably is substantially paraffinic in nature, hexane, for example.

While this invention has been described in conjunction with a present preferred embodiment, it should be evident that it is not limited thereto.

What is claimed is:

1. The method of producing ethylene which comprises heating a stream of ethane to a temperature sufficiently high to convert at least a portion of the ethane to ethylene, cooling the resulting products and passing same to a first absorption zone, introducing an absorbent into said first absorption zone to absorb substantially all of the components having six or more carbon atoms per molecule, directing the unabsorbed effluent from said first absorption zone to a second absorption zone, introducing a hydrocarbon absorbent into said second absorption zone which boils in the range of approximately 120 to approximately 190° F., and recovering the rich absorbent from said second absorption zone, said rich absorbent containing ethylene.

2. The method of producing ethylene which comprises heating a stream of ethane to a temperature sufficiently high to convert at least a portion of the ethane to ethylene, cooling the resulting products and passing same to a first absorption zone, introducing an absorbent into said first absorption zone to absorb substantially all of the components having six or more carbon atoms per molecule, directing the unabsorbed effluent from said first absorption zone to a second absorption zone, introducing a hydrocarbon absorbent into said second absorption zone which boils in the range of approximately 120 to approximately 190° F., passing the rich absorbent from said second absorption zone to a stripping zone, removing an overhead stream from said stripping zone which comprises essentially hydrocarbons having two carbon atoms per molecule, and separating said overhead stream into first and second product streams comprising major parts of ethylene and ethane, respectively.

3. The method of producing ethylene which comprises heating a stream of ethane to a temperature sufficiently high to convert at least a portion of the ethane to ethylene, cooling the resulting products and passing same to a first absorption zone, introducing an absorbent into said first absorption zone to absorb substantially all of the components having six or more carbon atoms per molecule, directing the unabsorbed effluent from said first absorption zone to a second absorption zone, introducing a hydrocarbon absorbent into said second absorption zone which boils in the range of approximately 120 to approximately 190° F., passing the rich absorbent from said second absorption zone to a stripping zone, removing an overhead stream from said stripping zone which comprises essentially hydrocarbons having two carbon atoms per molecule, separating said overhead stream into first and second product streams comprising major parts of ethylene and ethane, respectively, removing a kettle stream from said stripping zone, removing hydrocarbons from said kettle stream which boil in the range of approximately 120 to approximately 190° F., and returning the removed hydrocarbons to said second absorption zone as the absorbent therein.

4. The method of producing ethylene which comprises heating a stream of ethane to a temperature sufficiently high to convert at least a portion of the ethane to ethylene, cooling the resulting products and passing same to a first absorption zone, introducing an absorbent into said first absorption zone to absorb substantially all of the components having six or more carbon atoms per molecule, directing the unabsorbed effluent from said first absorption zone to a second absorption zone, introducing a hydrocarbon absorbent into said second absorption zone which boils in the range of approximately 120 to approximately 190° F., passing the rich absorbent from said second absorption zone to a stripping zone, removing an overhead stream from said stripping zone which comprises essentially hydrocarbons having two carbon atoms per molecule, separating said overhead stream into first and second product streams comprising major parts of ethylene and ethane, respectively, removing a first kettle stream from said stripping zone, flashing said first kettle stream to recover a stream containing at least a portion of the hydrocarbons which boil in the range of approximately 120 to approximately 190° F., passing vapors from the flashing step to a second fractionation zone, removing a second kettle stream which comprises hydrocarbons boiling in the range of approximately 120 to approximately 190° F., and combining said last two mentioned hydrocarbon containing streams and returning same to said second absorption zone as the absorbent therein.

5. The method of producing ethylene which comprises heating a stream of ethane to a temperature sufficiently high to convert at least a portion of the ethane to ethylene, cooling the resulting products and passing same to a first absorption zone, introducing an absorbent into said first absorption zone to absorb substantially all of the components having six or more carbon atoms per molecule, directing the unabsorbed effluent from said first absorption zone to a second absorption zone, introducing a hydrocarbon absorbent into said second absorption zone which boils in the range of approximately 120 to approximately 190° F., passing the rich absorbent from said second absorption through first and second heat exchange zones to a stripping zone, removing an overhead stream from said stripping zone, which comprises essentially hydrocarbons having two carbon atoms per molecule, separating said overhead stream into first and second product streams comprising major parts of ethylene and ethane, respectively, passing a kettle stream from said stripping zone through said second heat exchanger to a separating zone, removing hydrocarbons from said separating zone which boil in the range of approximately 120 to approximately 190° F., and returning same through said first heat exchanger to said second absorption zone as the absorbent therein.

6. The method of claim 1 wherein the first-mentioned absorbent is mineral seal oil and said hydrocarbon absorbent comprises material selected from the group consisting of paraffins and cycloparaffins having six carbon atoms per molecule.

7. The method of claim 6 wherein said hydrocarbon absorbent is normal hexane.

8. The method of claim 1 wherein said first-mentioned absorbent comprises mineral seal oil and wherein said first absorption zone is maintained at a pressure in the range of approximately 450 to approximately 150 pounds per square inch absolute and at a temperature sufficiently high to prevent hydrate formation in the vapor phase.

9. The method of producing ethylene which comprises heating a stream of a normally gaseous hydrocarbon to a temperature sufficiently high to convert at least a portion of the hydrocarbon to ethylene, cooling the resulting products and passing same to a first absorption zone, introducing an absorbent into said first absorption zone to absorb substantially all of the components having six or more carbon atoms per molecule, directing the unabsorbed effluent from said first absorption zone to a second absorption zone, introducing a hydrocarbon absorbent into said second absorption zone which boils in the range of approximately 120 to approximately 190° F., and recovering the rich absorbent from said second absorption zone, said rich absorbent containing ethylene.

10. The method of producing ethylene which comprises heating a stream of a normally gaseous hydrocarbon to a temperature sufficiently high to convert at least a portion of the hydrocarbon to ethylene, cooling the resulting products and passing same to a first absorption zone, introducing an absorbent into said first absorption zone to absorb substantially all of the components having six or more carbon atoms per molecule, directing the unabsorbed effluent from said first absorption zone to a second absorption zone, introducing a hydrocarbon absorbent into said second absorption zone which boils in the range of approximately 120 to approximately 190° F., passing the rich absorbent from said second absorption zone to a stripping zone, removing an overhead stream from said stripping zone which comprises essentially hydrocarbons having two carbon atoms per molecule, separating said overhead stream into first and second product streams comprising major parts of ethylene and ethane, respectively, removing a first kettle stream from said stripping zone, flashing said first kettle stream to recover a stream containing at least a portion of the hydrocarbons which boil in the range of approximately 120 to approximately 190° F., passing vapors from the flashing step to a second fractionation zone, removing a second kettle stream which comprises hydrocarbons boiling in the range of approximately 120 to approximately 190° F., and combining said last two mentioned hydrocarbon containing streams and returning same to said second absorption zone as the absorbent therein.

11. The method of separating hydrocarbons having two carbon atoms per molecule from a fluid mixture which also contains hydrocarbons having boiling points higher and lower than the boiling points of hydrocarbons having two carbon atoms per molecule which comprises passing such a mixture to a first absorption zone, introducing an absorbent into said first absorption zone to absorb substantially all of the components having six or more carbon atoms per molecule, directing the unabsorbed effluent from said first absorption zone to a second absorption zone, introducing a hydrocarbon absorbent into said second absorption zone which boils in the range of approximately 120 to approximately 190° F., and recovering the rich absorbent from said second absorption zone, said rich absorbent containing hydrocarbons having two carbon atoms per molecule.

12. The method of claim 11 wherein the first-mentioned absorbent is mineral seal oil and said hydrocarbon absorbent comprises material selected from the group consisting of paraffins and cycloparaffins having six carbon atoms per molecule.

13. The method of claim 12 wherein said hydrocarbon absorbent is normal hexane.

14. The method of claim 11 wherein said first-mentioned absorbent comprises mineral seal oil and wherein said first absorption zone is maintained at a pressure in the range of approximately 450 to approximately 150 pounds per square inch absolute and at a temperature sufficiently high to prevent hydrate formation in the vapor phase.

15. The method of separating hydrocarbons having two carbon atoms per molecule from a fluid mixture which also contains hydrocarbons having boiling points higher and lower than the boiling points of hydrocarbons having two carbon atoms per molecule which comprises passing such a mixture to a first absorption zone, introducing an absorbent into said first absorption zone to absorb substantially all of the components having six or more carbon atoms per molecule, directing the unabsorbed effluent from said first absorption zone to a second absorption zone, introducing a hydrocarbon absorbent into said second absorption zone which boils in the range of approximately 120 to approximately 190° F., passing the rich absorbent from said second absorption zone to a stripping zone, removing an overhead stream from said stripping zone which comprises essentially hydrocarbons having two carbon atoms per molecule, separating said overhead stream into first and second product streams comprising major parts of ethylene and ethane, respectively, removing a first kettle stream from said stripping zone, flashing said first kettle stream to recover a stream containing at least a portion of the hydrocarbons which boil in the range of approximately 120 to approximately 190° F., passing vapors from the flashing step to a second fractionation zone, removing a second kettle stream which comprises hydrocarbons boiling in the range of approximately 120 to approximately 190° F., and combining said last two mentioned hydrocarbon containing streams and returning same to said second absorption zone as the absorbent therein.

References Cited in the file of this patent

UNITED STATES PATENTS

| | | |
|---|---|---|
| 2,226,467 | Hjerpe et al. | Dec. 24, 1940 |
| 2,573,341 | Kniel | Oct. 30, 1951 |
| 2,745,889 | Johnston et al. | May 15, 1956 |
| 2,780,580 | Kniel | Feb. 5, 1957 |